United States Patent [19]

Mano et al.

[11] Patent Number: 5,040,172
[45] Date of Patent: Aug. 13, 1991

[54] COMMUNICATION METHOD UTILIZING CHANNEL HIGHWAY AND DIGITAL COMMUNICATION APPARATUS FOR REALIZING THE SAME

[75] Inventors: Hiroshi Mano; Masayuki Tsurusaki, both of Tokyo, Japan

[73] Assignee: Kabushiki Kaisha Toshiba, Kawasaki, Japan

[21] Appl. No.: 490,508

[22] Filed: Mar. 1, 1990

Related U.S. Application Data

[63] Continuation of Ser. No. 228,518, Aug. 5, 1988, abandoned.

[30] Foreign Application Priority Data

Aug. 18, 1987 [JP] Japan ................... 62-203552

[51] Int. Cl.$^5$ ............... H04L 5/14; H04Q 11/04
[52] U.S. Cl. ........................... 370/29; 370/24; 370/67; 370/85.11; 370/95.1
[58] Field of Search ............. 370/24, 29, 58.1, 58.2, 370/58.3, 66, 67, 68, 85.1, 85.7, 85.11, 95.1, 95.3

[56] References Cited

U.S. PATENT DOCUMENTS

| | | | |
|---|---|---|---|
| 3,959,594 | 5/1976 | Srivastava | 370/67 |
| 4,004,099 | 1/1977 | Jones et al. | 370/85 |
| 4,078,228 | 3/1978 | Miyazaki | 370/29 |
| 4,140,877 | 2/1979 | Joslow et al. | 370/67 |
| 4,500,991 | 2/1985 | Lubcke et al. | 370/85.11 |
| 4,583,217 | 4/1986 | Kittel | 370/95 |
| 4,630,263 | 12/1986 | Townsend et al. | 370/85 |
| 4,697,263 | 9/1987 | Beaufoy | 370/85 |
| 4,759,017 | 7/1988 | Allan et al. | 370/85.11 |
| 4,763,320 | 8/1988 | Rudolph et al. | 370/95 |
| 4,791,629 | 12/1988 | Burns et al. | 370/95 |
| 4,809,270 | 2/1989 | Baxter et al. | 370/95 |

Primary Examiner—Douglas W. Olms
Assistant Examiner—Alpus H. Hsu
Attorney, Agent, or Firm—Oblon, Spivak, McClelland, Maier & Neustadt

[57] ABSTRACT

A digital communication apparatus in which time slots need not be switched, comprises a single channel highway in which a plurality of time slots are time-divisionally multiplexed, and first and second transmitting-/receiving units connected to the highway. The first transmitting/receiving unit transmits a first signal supplied from a first terminal to the second transmitting-/receiving unit through the highway using a first time slot designated from the plurality of time slots. The second transmitting/receiving unit outputs the first signal transmitted from the first transmitting/receiving unit through the highway using the designated first time slot to a second terminal. A second signal from the second terminal is transmitted to the first transmitting-/receiving unit through the highway using a designated second time slot. The first transmitting/receiving unit outputs the second signal transmitted from the second transmitting/receiving unit through the highway using the designated second time slot to the first terminal. The first and second time slots are selectively designated from the plurality of time slots in accordance with calling from the first terminal to the second terminal.

8 Claims, 5 Drawing Sheets

COMMUNICATION METHOD UTILIZING CHANNEL HIGHWAY AND DIGITAL COMMUNICATION APPARATUS FOR REALIZING THE SAME

This application is a continuation of application Ser. No. 228,518 filed on Aug. 5, 1988, now abandoned.

BACKGROUND OF THE INVENTION

1. Field of the Invention

The present invention relates to a communication method utilizing a time-divisionally multiplexed channel highway and a digital communication apparatus employed in, for example, a key telephone system for realizing the same.

2. Description of the Related Art

As shown in FIG. 1, a conventional digital communication apparatus employed in a key telephone system comprises a main unit 1 and a plurality of telephone sets $2i$ ($i=a$ to $n$) connected to main unit 1. Telephone set $2a$ can be assumed to be a line-wire telephone, and telephone set $2j$ ($j=b$ to $n$) can be assumed to be an extension telephone. Up channel highway 10-1 and down channel highway 10-2 are independently formed in main unit 1 and connected by time switch (TSW) 11. Telephone set $2i$ is connected to highways 10-1 and 10-2 through interface circuit (INF) $12i$ and codec $13i$.

Each interface circuit $12i$ is connected to corresponding telephone set $2i$ through a telephone line, supplies power to telephone set $2i$ and transmits/receives a control signal to/from telephone set $2i$. Each codec $13i$ includes transmitting terminal Tx and receiving terminal Rx for PCM code data, and terminals Tx and Rx are connected to highways 10-1 and 10-2, respectively. Codec $13i$ samples a voice analog signal from telephone set $2i$ at, e.g., 8 kHz. The sampled signal is converted into 8-bit PCM code data in accordance with $\mu$/L law, and the converted code is supplied to a predetermined time slot of highway 10-1 through terminal Tx. At the same time, codec $13i$ converts PCM code data received at terminal Rx from the predetermined time slot of highway 10-2 into a voice analog signal in a manner opposite to that described above. The converted signal is supplied to corresponding telephone set $2i$. That is, codec $13i$ simultaneously performs transmission and reception.

In each codec, a time slot for transmitting/receiving PCM code data is determined in accordance with time slot signal TSS(i) supplied to transmitting time slot signal input terminal TxTS and receiving time slot signal input terminal RxTS and clock signal PHCLK supplied to clock input terminal CLK. Signal TSS(i) is supplied from TS assigner $14i$ provided in correspondence to each codec. Signal PHCLK is supplied from timing signal generator 16 directly to terminal CLK.

An address (ADRSi) is assigned to each TS assigner $14i$. Assigner $14i$ determines the time slot signal TSS(i) in accordance with the address (ADRSi) and input frame signal PHFS and clock signal PHCLK. Signals PHFS and PHCLK are supplied from generator 16 in accordance with an output from oscillator 15.

Time switch 11 is connected together with interface circuit $12i$ to CPU 18 and memory (MM) 19 through $\mu$P bus 17. CPU 18 controls switch 11 and circuit $12i$ on the basis of an operation program stored in memory 19. Switch 11 switches time slots on up and down channel highways 10-1 and 10-2 under the control of CPU 18.

As a result, a channel is formed from, e.g., caller telephone set $2a$ to callee telephone set $2b$.

Assume that time slot 0 (represented by TxTS=0 and RxTS=0) is fixedly assigned to telephone set $2a$, and time slot 1 (represented by TxTS=1 and RxTS=1) is fixedly assigned to telephone set $2b$, respectively. Formation of a channel between telephone sets $2a$ and $2b$ in this case will be described below with reference to timing charts shown in FIGS. 2A to 2E. Note that the timing charts in FIGS. 2A to 2E correspond to only an operation of telephone set $2a$.

As shown in FIGS. 2A to 2C, signal TSS(a) is formed in accordance with signals PHFS and PHCLK supplied from generator 16. Formed signal TSS(a) has a time length of 8 clocks from the leading edge of signal PHFS. Signal TSS(a) is supplied to terminals TxTS and RxTS of codec $13a$.

Codec $18a$ modulates a voice analog signal from telephone set $2a$ into PCM code data C0 to C7 in time slot 0 designated by signal TSS(a). Modulated data C0 to C7 are supplied to up channel highway 10-1 as up data PHIN sequentially from LSB(C0) to MSB(C7) at the leading edges of signal PHCLK, as shown in FIG. 2D. Up data PHIN supplied in time slot 0 is switched to time slot 1 in switch 11 for codec $13b$. This time slot switching is controlled by CPU 18 on the basis of dial number information of telephone set $2b$ supplied from telephone set $2a$ prior to communication.

Thereafter, up data PHIN switched to time slot 1 is supplied to down channel highway 10-2 as down data PHOUT. At this time, TS assigner $14b$ generates signal TSS(b) in accordance with signals PHFS and PHCLK in the same manner as signal TSS(a) and outputs signal TSS(b) to input terminals TxTS and RxTS of codec $13b$.

Codec $13b$ receives data C0 to C7 as down data PHOUT from highway 10-2 at the trailing edges of signal PHCLK in time slot 1 designated by signal TSS(b). Thereafter, codec $13b$ demodulates received down data PHOUT into a voice analog signal. The demodulated signal is supplied to telephone set $2b$ through interface circuit $12b$. In this manner, the voice from telephone set $2a$ is supplied to telephone set $2b$.

A voice from telephone set $2b$ is supplied to telephone set $2a$ in an order opposite to the above one. That is, PCM code data D0 to D7 modulated by codec $13b$ are supplied as up data PHIN to highway 10-1 in time slot 1. Data PHIN is supplied to highway 10-2 in time slot 0 by switch 11. As described above, when signal TSS(a) of time slot 0 is supplied from TS assigner $14a$, codec $13a$ receives data PHOUT from highway 10-2 sequentially from LSB(D0) to MSB(D7) at the trailing edges of signal PHCLK, as shown in FIG. 2E. Received data PHOUT is demodulated into a voice analog signal. The demodulated signal is supplied to telephone set $2a$ through interface circuit $12a$. In this manner, the voice from telephone set $2b$ is also supplied to telephone set $2a$, thereby enabling communication between operators.

As described above, in the conventional digital communication apparatus, the up and down channel highways are formed independently from each other, and therefore the time switch for switching time slots on both the channel highways must be provided. As is well known, the time switch includes a high-speed buffer memory, a serial/parallel converter, a parallel/serial converter, a control memory, and the like and hence is expensive although a one-tip LSI is developed. If the circuit is constituted by discrete parts, a size of a circuit structure is increased.

SUMMARY OF THE INVENTION

The present invention has been made in consideration of the above situation and has as its object to provide a method of digital communication in which a time switch is not used and therefore an arrangement is simplified and time slots need not be switched.

In this method, a first time slot address is generated in accordance with calling from a first terminal. A plurality of time slots are multiplexed in a channel highway. A first time slot is designated from the plurality of time slots in accordance with the first time slot address. First data is transmitted from the first terminal onto the channel highway using the first time slot. At a receiving side, the first time slot is designated in accordance with the first time slot address. The first data transmitted using the first time slot is received and output to a second terminal.

A second signal is transmitted from the second to first terminal using a second time slot in the same manner as described above.

A digital communication apparatus according to the present invention comprises a channel highway in which a plurality of time slots are time-divisionally multiplexed, and first and second transmitting/receiving units connected to the highway. The first transmitting/receiving unit transmits first data supplied from first terminal to the second transmitting/receiving unit through the highway using a first time slot designated from the plurality of time slots. The second transmitting/receiving unit outputs to a second terminal the first data transmitted from the first transmitting/receiving unit through the highway using the designated first time slot. Second data from the second terminal is transmitted to the first transmitting/receiving unit through the highway using a designated second time slot. The first transmitting/receiving unit outputs the second data transmitted from the second transmitting/receiving unit through the highway using the designated second time slot to the first terminal.

The first and second time slots are selectively designated from the plurality of time slots in accordance with calling from the first to second terminal.

As described above, according to the digital communication apparatus of the present invention, the channel is constituted by variably designating both the transmitting and receiving time slots on the single channel highway. Therefore, a time switch for switching the transmitting and receiving time slots need not be used. In addition, reduction in manufacturing cost and compactness of a circuit structure can be simultaneously achieved.

DETAILED DESCRIPTION OF THE PREFERRED EMBODIMENT

An embodiment of a digital communication apparatus according to the present invention will be described below with reference to the accompanying drawings.

First, referring to FIG. 3, an arrangement of an embodiment of the digital communication apparatus according to the present invention will be described.

Figure 3:
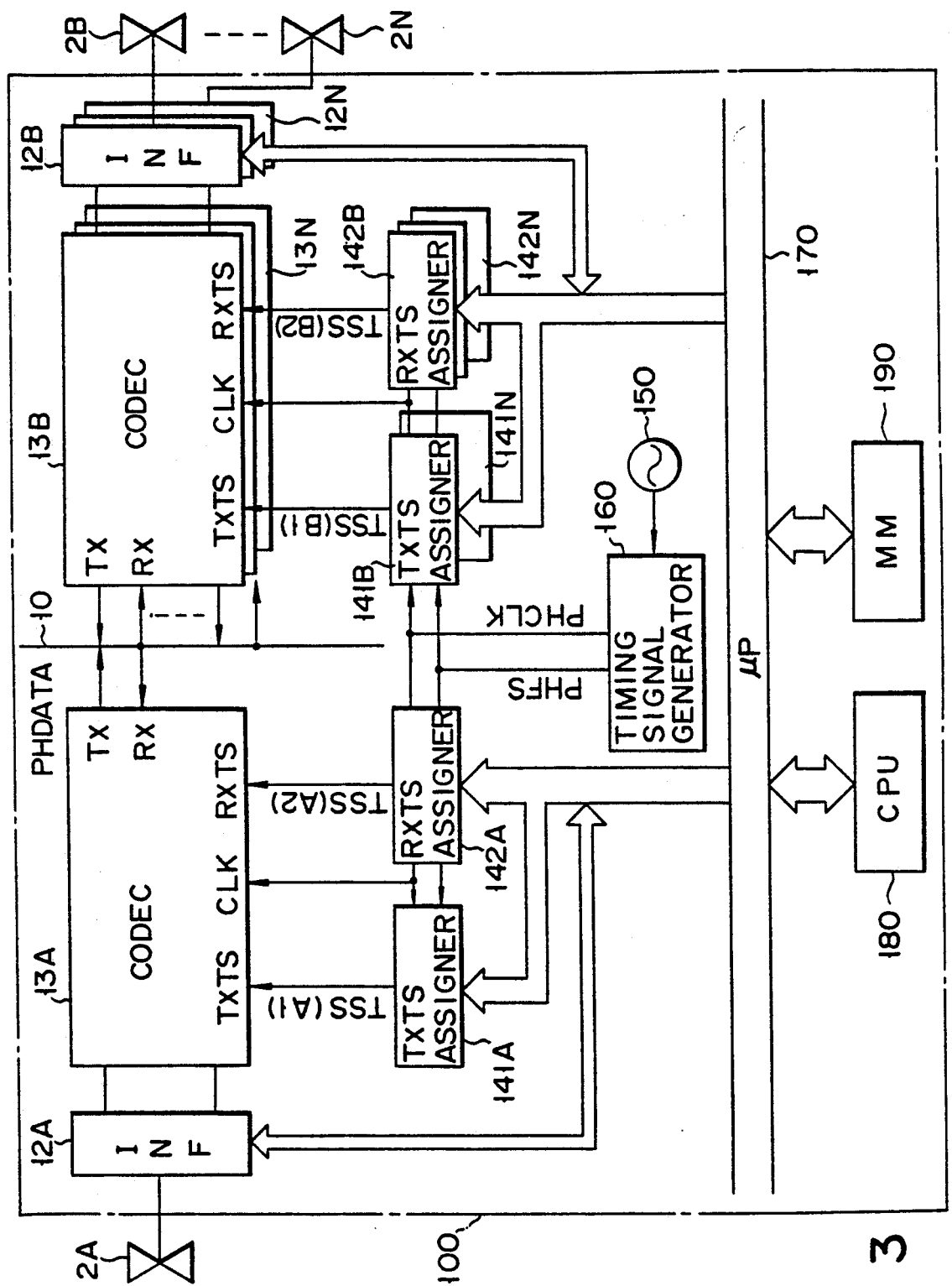
FIG. 3 is a block diagram showing an embodiment of a digital communication apparatus according to the present invention.

In FIG. 3, the digital communication apparatus comprises main unit 100 and a plurality of telephone sets $2i$ ($i=A$ to N) connected to unit 100. In main unit 100, single channel highway 10 is connected to each telephone set $2i$ through corresponding interface circuit $12i$ and corresponding codec $13i$. It should be noted that both of transmitting terminal Tx and receiving terminal Rx for PCM code data provided to each codec $13i$ are connected to highway 10.

Codec $13i$ is connected to corresponding TxTS assigner $141i$ and corresponding RxTS assigner $142i$. Frame signal PHFS and clock signal PHCLK formed by timing signal generator 160 on the basis of an output from oscillator 150 are supplied to assigners $141i$ and $142i$. Assigners $141i$ and $142i$ are connected together with corresponding interface circuit $12i$ to CPU 180 and memory (MM) 190 through μP bus 170. Memory 190 stores time slot busy table 192.

Figure 4:
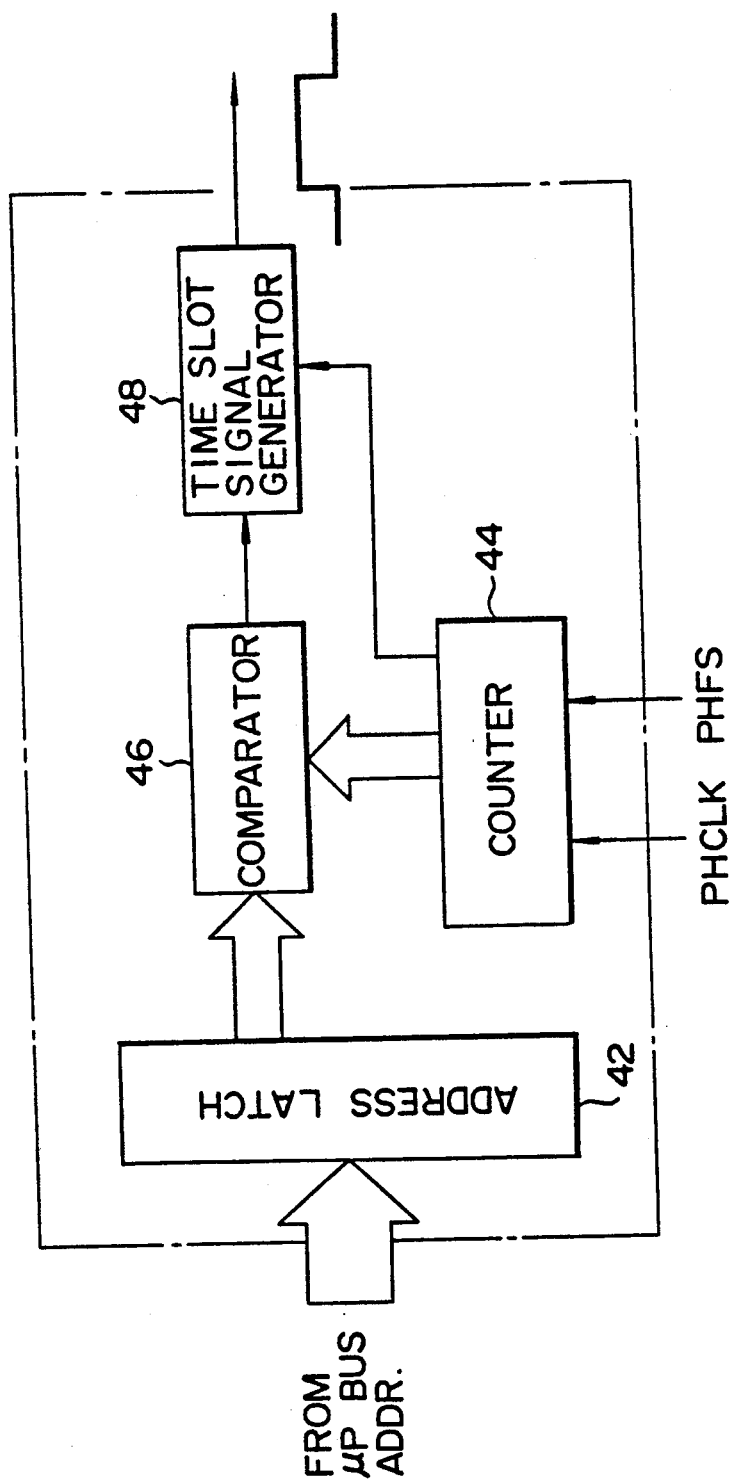
FIG. 4 is a block diagram showing an arrangement of a TS assigner of the apparatus in FIG. 3.

An arrangement of TxTS assigner 141A will be described below with reference to FIG. 4. Arrangements of TxTS assigners 141B to 141N and RxTS assigner $142i$ are the same as that of TxTS assigner 141A. In FIG. 4, address latch 42 latches a time slot address (ADRS) supplied from CPU 180 through μP bus 170. Latched address ADRS is output to comparator 46. Counter 44 counts signals PHCLK and PHFS supplied from generator 160 and outputs the count to comparator 46. If the count from counter 44 becomes equal to latched address ADRS, comparator 46 outputs a pulse to time slot signal generator 48. Generator 48 outputs time slot signal TSS(A1) in synchronism with signal PHCLK.

In this manner, TxTS and RxTS assigners 141A, 141B, 142A and 142B form, under the control of CPU 180, transmitting time slot signals TSS(A1) to TSS(B1) and receiving time slot signals TSS(A2) to TSS(B2) for PCM code data in accordance with the designated time slot address and frame and clock signals PHFS and PHCLK supplied from generator 160, respectively. Signal TSS(i1) is supplied to terminal TxTS of corresponding codec $13i$, and signal TSS(i2) is supplied to terminal RxTS of corresponding codec $13i$. Therefore, in codec $13i$, the transmitting and receiving time slots can be independently and variably designated upon each communication.

Note that control of switching and connecting channels including designation of the address is executed by CPU 180 on the basis of a calling processing program stored in memory 190.

As described above, in the digital communication apparatus of the present invention, both the up and down channel highways are combined in a signal channel highway. Therefore, instead of switching time slots on the up and down channel highways by the time switch in the conventional digital communication apparatus, the transmitting and receiving time slots to the corresponding codecs are independently designated by the TxTS and RxTS assigners. As a result, a time switch for forming a channel between a caller telephone set (e.g., 2A) and a callee telephone set (e.g., 2B) need not be used.

Figure 5:
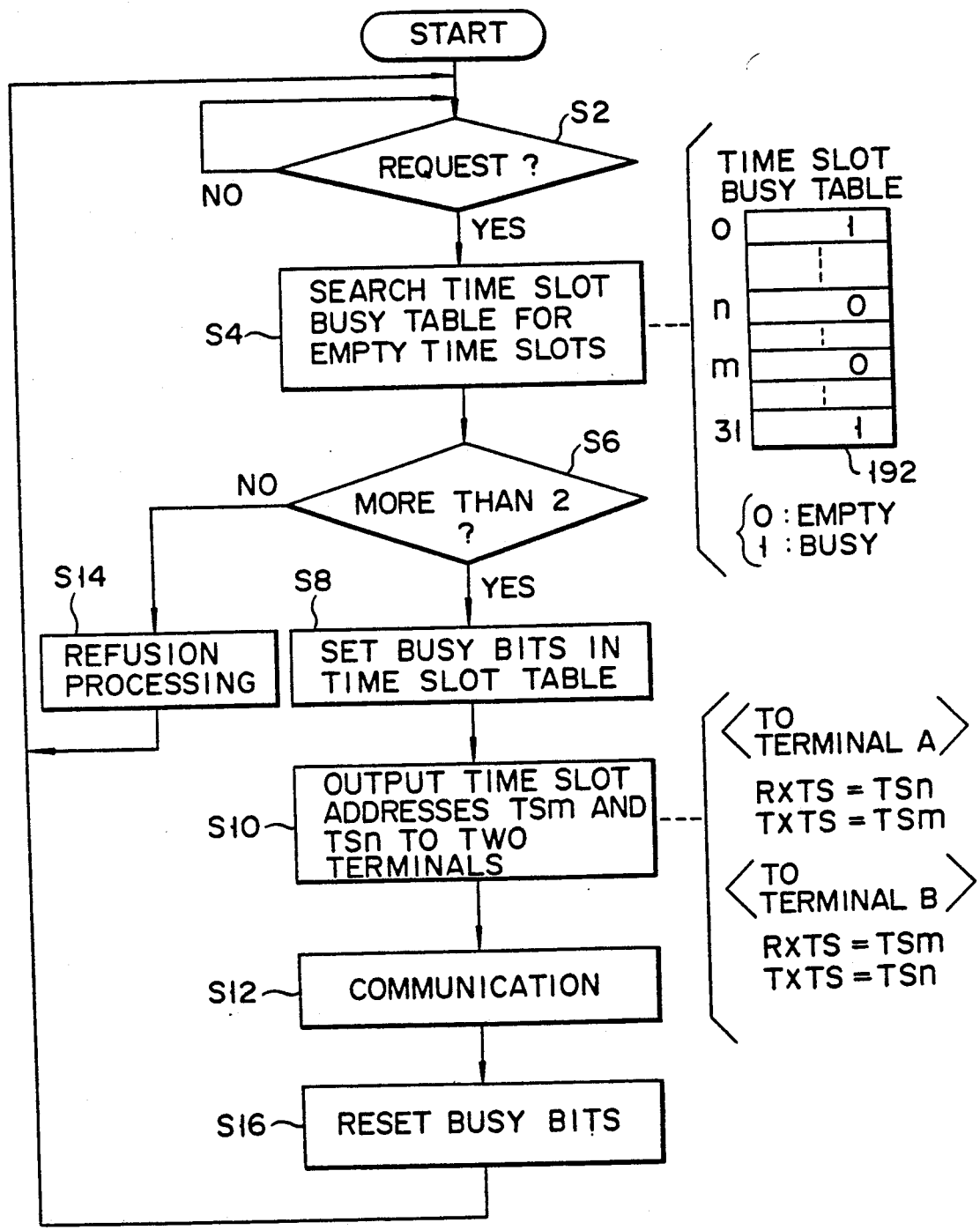
FIG. 5 is a flow chart for explaining an operation of the embodiment of the digital communication apparatus.

A method of forming a channel between telephone sets 2A and 2B will be described below with reference to the flow chart in FIG. 5 and the timing charts in FIGS. 6A to 6E. Note that the timing charts in FIGS. 6A to 6E correspond to only an operation of telephone set 2A.

In step S2, CPU 180 checks whether a communication request, i.e., a calling is performed from telephone set 2A to telephone set 2B. If Y (YES) in step S2, step S4 is executed. In step S4, time slot busy table 192 in memory 190 is referred to check whether two or more empty time slots, i.e., unused time slots are present. If two or more empty time slots are not present, N (NO) is determined in step S6. This means that a telephone line is busy. In this case, refusion processing is executed in step S14. For example, a tone representing "busy" is generated. Alternatively, a message may be output.

Assume that time slots $m$ and $n$ are empty in step S6. In this case, Y is determined in step S6, and busy bits are set in locations of table 192 corresponding to the two time slots to be used, in step S8. In this manner, time slots $m$ and $n$ are reserved. Assume that time slot $m$ is assigned as a transmitting time slot for PCM code data from telephone set 2A and time slot $n$ is assigned as a transmitting time slot for PCM code data from telephone set 2B. This state is presented as TxTS=m and RxTS=n with respect to telephone set 2A and as TxTS=n and RxTS=m with respect to telephone set 2B, respectively. In this case, various assigning methods can be performed. For example, one of the empty time slots having a smaller number may be assigned to a caller terminal (telephone set), and another empty time slot having a next smaller number may be assigned to a callee terminal (telephone set).

In step S10, assigned time slots are reserved. First, time slot address TSm corresponding to assigned time slot $m$ is output to TxTS assigner 141A and RxTS assigner 142B, and time slot address TSn corresponding to assigned time slot $n$ is output to TxTS assigner 142A and RxTS assigner 141B, respectively. Destinations of addresses TSm and TSn are determined on the basis of the caller terminal (telephone set 2A) and dial number information of the callee terminal (telephone set 2B) designated by the caller terminal (telephone set 2A).

Figure 1:
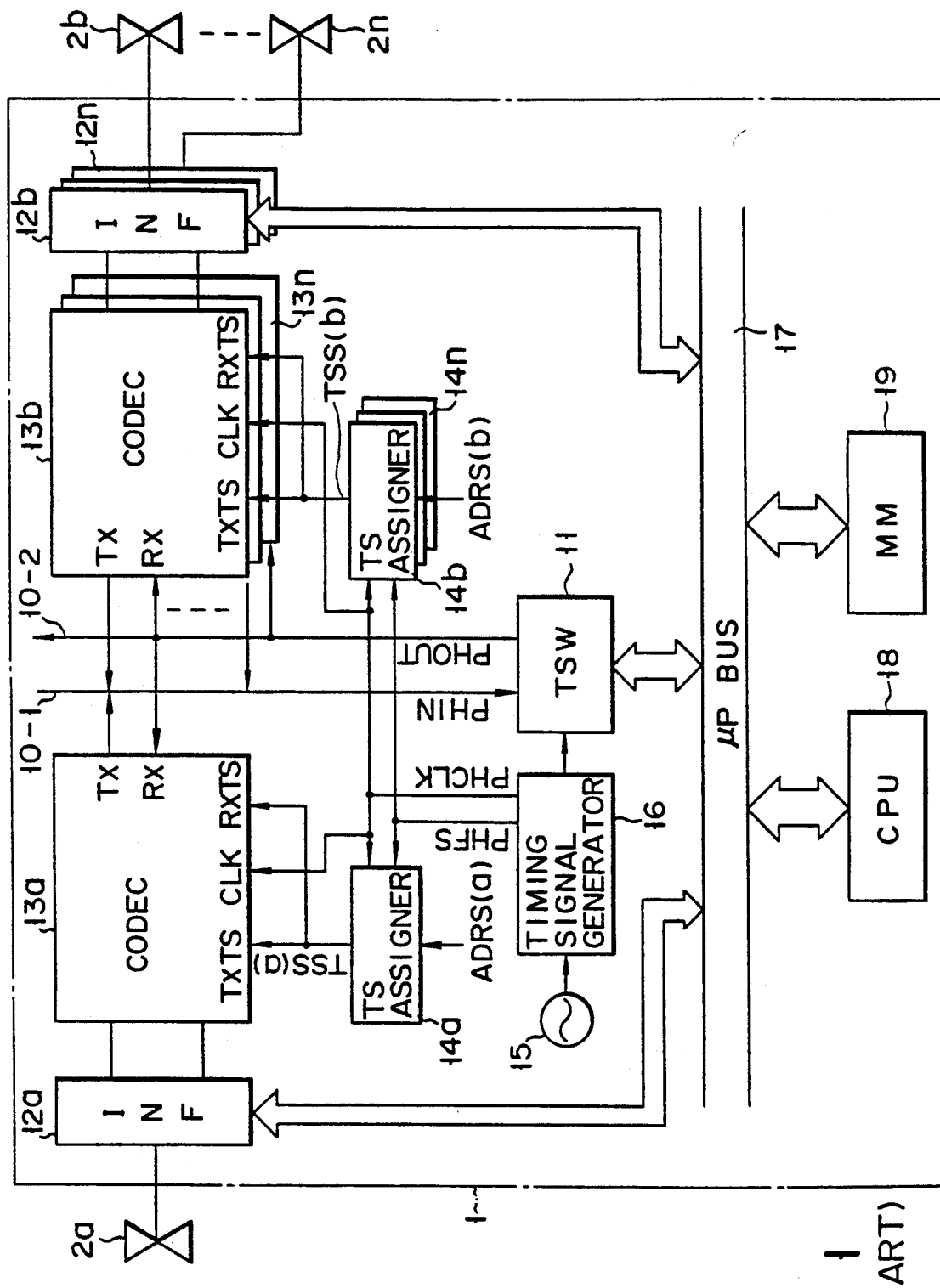
FIG. 1 is a block diagram showing an arrangement of a conventional digital communication apparatus.
Figure 2:
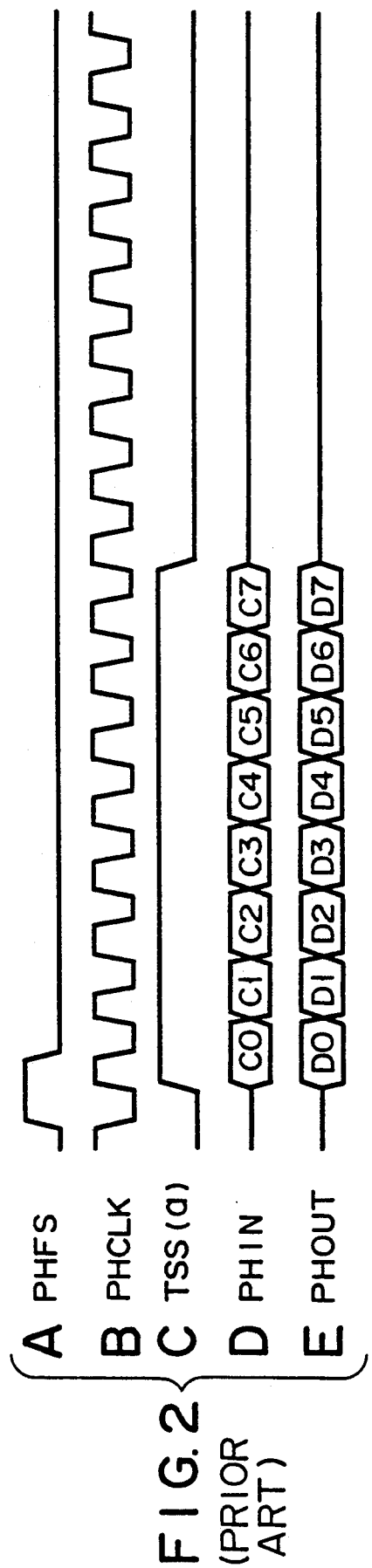
FIGS. 2A to 2E are timing charts showing an operation of a telephone set during communication of the apparatus in FIG. 1.
Figure 6:
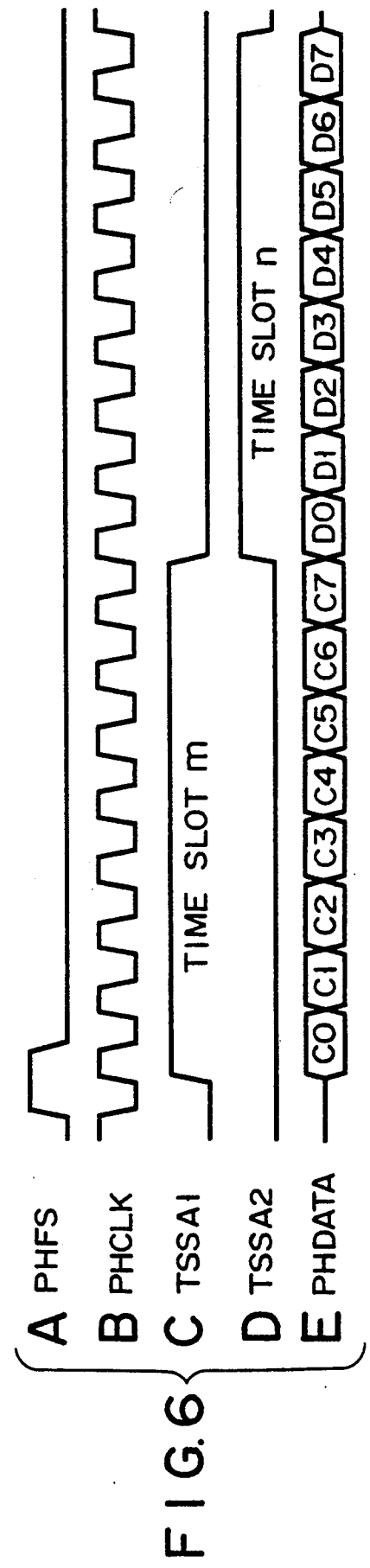
FIGS. 6A to 6E are timing charts showing an operation of a telephone set in key telephone system during communication of the apparatus in FIG. 3.

In step S12, communication is performed. In response to address TSm, assigner 141A forms time slot signal TSS(A1) which maintains an "H" level for 8 clocks from the leading edge of clock signal PHCLK after frame signal PHFS rises, as shown in FIG. 6C. Signal TSS(A1) is supplied to input terminal TxTS of the codec. Codec 13A modulates a voice analog signal from telephone set 2A into PCM code data. The PCM code data is supplied to highway 10 as up data PHDATA in time slot $m$ designated by signal TSS(A1). The PCM code data is output sequentially from LSB(C0) to MSB(C7) in synchronism with the leading edges of signal PHCLK, as shown in FIG. 6E.

In response to address TSm, assigner 142B forms signal TSS(B2), which is the same as signal TSS(A1), in accordance with signals PHFS and PHCLK, and outputs signal TSS(B2) to input terminal RxTS of codec 13B. Codec 13B sequentially receives data C0 to C7 as down data PHDATA in time slot $m$ on highway 10 in synchronism with the trailing edges of signal PHCLK. Thereafter, codec 13B demodulates data PHDATA received from highway 10 into a voice analog signal and supplies the obtained signal to telephone set 2B through interface circuit 12B. In this manner, the voice is supplied from telephone set 2A to 2B.

In order to send a voice from telephone set 2B to 2A, an operation is executed in an order opposite to the above one. That is, CPU 180 supplies address TSn corresponding to time slot $n$ to TxTS assigner 141B corresponding to codec 13B and to RxTS assigner 142A corresponding to codec 13A, respectively.

In response to address TSn, assigner 141B forms time slot signal TSS(B1) which maintains an "H" level for 8 clocks in synchronism with the leading edge of clock signal HCLK, as shown in FIG. 6D. Signal TSS(B1) is output to input terminal TxTS of codec 13B. Codec 13B modulates a voice analog signal from telephone set 2B in PCM code data D0 to D7 and supplies the obtained PCM code data as up data PHDATA to channel highway 10 in time slot $n$ designated by signal TSS(B1) in synchronism with the leading edge of signal PHCLK.

Meanwhile, in response to address TSn from CPU 180, assigner 142A forms signal TSS(A2) which is the same as signal TSS(B1) and supplies signal TSS(A2) to input terminal RxTS of codec 13A. In response to signal TSS(A2), codec 13A receives data D0 to D7 in time slot $n$ on highway 10 as down data PHDATA sequentially from LSB(D0) to MSB(D7) in synchronism with the leading edges of signal PHCLK. Thereafter, codec 13A demodulates data PHDATA received from highway 10 into a voice analog signal and supplies the obtained signal to telephone set 2A through interface circuit 12A. In this manner, a channel is formed between telephone sets 2A and 2B, thereby enabling communication between operators.

When the communication is completed, the busy bits of locations $n$ and $m$ in table 192 are reset in step S16.

As described above, in the digital communication apparatus of the present invention, both the transmitting and receiving time slots can be variably designated. Therefore, communication can be exchanged without using a time switch.

For this reason, a larger number of codecs than that of time slots assigned to a single channel highway can be connected. In addition, since the number of telephone lines is not limited to that of the time slots, a system can be constructed more effectively and flexibly. Therefore, the present invention is most suitably applied to a small-capacity digital communication apparatus.

Furthermore, as described above, since both the transmitting and receiving time slots can be variably designated, supplied PCM code data can be fetched in all the time slots in the single channel highway. In addition, since the PCM code data can be fetched in a single time slot by a plurality of codecs, multi-cast calling (paging) or various service tones can be controlled very easily. In the case of the service tones supplied, only one empty time slot need be present in step S6 in FIG. 5 because only one time slot is used.

Note that in the above embodiment, the time slot address is output to the TxTS and RxTS assigners when calling is performed by telephone set 2A. However, the address may be output immediately before the designated time slot. Alternatively, the CPU may output different time slot addresses when control data is input during communication. Assume that, for example, time slots 0 and 1 currently used. When it is necessary to use time slot 0, for important information, the time slot 0 can be assigned for the information. In this case, the communication can be continued using another empty time slot assigned in accordance with the control data. In above-mentioned case, a time slot address assigning method is the same as in the above embodiment except that the control data is used in place of calling.

What is claimed is:

1. A communication apparatus for transmitting communication data among a plurality of terminal devices time-divisionally under the control of a main unit coupled to the terminal devices, each of the terminal devices being assigned with a plurality of time slots respectively within a frame period covering the time slots of the terminal devices connected to the main unit, and each of the terminal devices being provided with a time slot for transmitting its communication data to a communication data bus provided in the main unit, comprising:

a bi-directional communication data bus in which the plurality of time slots are time-division multiplexed for transmitting and receiving the communication data;

first transmitting/receiving interface means coupled to a first terminal device of said plurality of terminal devices for transmitting a first communication request signal and a first call signal generated from the main unit;

second transmitting/receiving interface means coupled to a second terminal device of said plurality of terminal devices for transmitting a second communication request signal and a second call signal generated from the main unit;

first transmitting/receiving means, coupled between said first transmitting/receiving interface means and said communication data bus for transmitting a first communication data from said first terminal device to said communication data bus when said first transmitting/receiving means is set to a transmission mode during a first time slot assigned to the first terminal device and for receiving a second communication data from said second terminal device when said first transmitting/receiving means is set to a reception mode other than the first time slot period;

second transmitting/receiving means, coupled between said second transmitting/receiving interface means and said communication data bus, for transmitting the second communication data from the second terminal device to said communication data bus when said second transmitting/receiving means is set to a transmitting mode during a second time slot assigned to said second terminal device and for receiving the first communication data when said second transmitting/receiving means is set to a reception mode other than the second time slot period;

first time assigner means for selectively setting said first transmitting/receiving means to one of said transmission and reception modes so as to control an access operation of said first transmitting/receiving means to said communication data bus;

second time assigner means for selectively setting said second transmitting/receiving means to one of said transmission and reception modes so as to control an access operation of said second transmitting/receiving means to said communication data bus;

communication control means including means for supplying a first control signal for driving said first time assigner means to generate a first mode setting signal for setting said first transmitting/receiving means to the transmission mode in accordance with the first transmission request signal generated from said first terminal device during the first time slot and to the reception mode other than the first time slot period and for setting said second transmitting/receiving means to the reception mode, and means for supplying a second control signal for driving said second time assigned means to generate a second mode setting signal for setting said second transmitting/receiving means to the transmission mode in accordance with the second transmission request signal generated from said second terminal device during the second time slot and to the reception mode other than the second time slot period and for setting said first transmitting/receiving means to the reception mode; and communication control data channel coupled between said first and second interface means and said communication control means for transmitting said first and second transmission request signals to said communication control means and for transmitting the first and second control signals to said first and second time assigner means.

2. An apparatus according to claim 1, wherein each of said first and second transmitting/receiving means includes CODEC means for coding the communication data transmitted to said communication data bus into PCM code data and for decoding the PCM code data received from the communication data bus into the communication data.

3. An apparatus according to claim 1, wherein said communication control means includes a time slot busy table for storing busy signals in response to the first and second communication request signals sent from said first and second terminal devices.

4. An apparatus according to claim 3, wherein:

said communication control means includes means for generating time slot addresses in accordance with the first and second communication request signals sent from said first and second terminal devices and the busy signals stored in said time slot busy table; and each of said first and second time assigner means includes, means for latching the time slot addresses, respectively, means for generating clock signals based on the frame signal, means for counting the clock signals to generate count contents, and means for comparing the count contents with the time slot addresses to generate the first and second time slots.

5. A method of transmitting communication data among a plurality of terminal devices time-divisionally under the control of a main unit coupled to the terminal devices, each of the terminal devices being assigned with a plurality of time slots respectively within a frame period covering the time slots of the terminal devices connected to the main unit, and each of the terminal devices being provided with a time slot for transmitting its communication data to a bi-directional communication data bus provided in the main unit, comprising the steps of:

transmitting a first communication request signal sent from a first terminal device to the main unit;

transmitting a second communication request signal sent from a second terminal device to the main unit;

transmitting call signals generated from the main unit to the first and second terminal devices;

determining first and second time slots assigned to the first and second terminal devices, respectively;

transmitting a first communication data from said first terminal device to said bi-directional communication data bus during the first time slot assigned to the first terminal device and setting to a reception mode for receiving a second communication data from said second terminal device other than the first time slot period; and transmitting the second communication data from the second terminal device to said bi-directional communication data bus during the second time slot assigned to said second terminal device and setting to a reception mode for receiving the first communication data other than the second time slot period.

6. A method according to claim 5, wherein each of said first and second transmitted transmission data is coded into PCM code data and the PCM code data received from the communication data bus is decoded into the communication data.

7. A method according to claim 5, wherein said calling signal transmitting step from the main unit includes the steps of collating a time slot busy table storing busy signals in response to the first and second communication request signals sent from said first and second terminal devices.

8. A method according to claim 7, wherein:

said collating step includes the steps of generating time slot addresses in accordance with the first and second communication request signals sent from said first and second terminal devices and the busy signals stored in said time slot busy table; and each of said transmission and reception mode setting steps includes the steps of, latching the time slot addresses, respectively, generating clock signals based on the frame signal;

counting the clock signals to generate count contents, and comparing the count contents with the time slot addresses to generate the first and second time slots.

* * * * *